Dec. 11, 1945.   S. A. SCHERBATSKOY   2,390,739
SYSTEM AND APPARATUS FOR MEASURING CLOUD HEIGHT AND THICKNESS
Filed Oct. 15, 1942
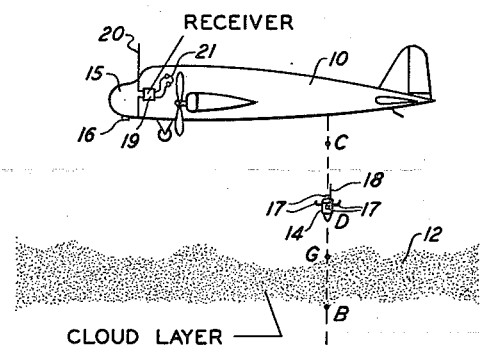
INVENTOR
Serge Alexander Scherbatskoy Patented Dec. 11, 1945

2,390,739

UNITED STATES PATENT OFFICE 2,390,739

SYSTEM AND APPARATUS FOR MEASURING CLOUD HEIGHT AND THICKNESS

Serge Alexander Scherbatskoy, Tulsa, Okla.

Application October 15, 1942, Serial No. 462,152

12 Claims. (Cl. 250—1)

This invention relates to an improvement in methods and instruments for assisting landing operations of aircraft and is particularly applicable for providing the navigator with information regarding cloud height and thickness in the territory in which he is about to land.

This invention is particularly applicable in case of an emergency landing over unkown territory and in presence of clouds and fog and low ceiling conditions. In order to decide whether or not a landing operation may be performed with a reasonable amount of safety, the navigator must be in possession of a certain number of data regarding the terrain conditions in the proposed landing area and regarding certain meteorological conditions in the neighborhood of the landing area. Among those data one of the most important is the ceiling height in the landing area. The ceiling height is a generally accepted term which refers particularly to landing areas and designates the height of the lowest cloud base above the landing area. If the ceiling height is relatively high the indication obtained by means of the present instrument will inform the navigator that the conditions are favorable for landing. If, however, the ceiling height is low, the indication obtained will serve as a warning and may prevent a possible crash.

The most successful methods of measuring ceiling heights in a given area involve the use of ceiling projectors and exploring balloons (see for instance "Meteorological Instruments" by W. E. Knowles Middleton, The University of Toronto Press, Toronto, Canada, 1941, pp. 169–174). These methods can be practiced only by observers located on the ground. In case of a plane lost over an unknown and possibly uninhabited territory there is usually no information available regarding the ceiling height and it is usually not possible to secure this information from any local or distant weather transmitting station.

Therefore, as far as I know there does not exist any method at the present time which would enable the navigator to determine whether or not he can perform an emergency landing operation with a reasonable degree of safety.

It is an object of this invention therefore to provide facilities for supplying information to an aircraft navigator in any type of weather regarding the thickness of cloud layers beneath the aircraft (even if extending to the ground), the height and bottom of each layer, and the number of layers. In many instances a knowledge of the thickness of a cloud layer would determine whether or not the aircraft pilot should descend through it or remain over or in it.

It is a further object of this invention to provide apparatus for informing an aircraft navigator regarding the clearance between the aircraft and the earth's surface.

It is a further object of this invention to provide an improved exploring instrument which when dropped from an aircraft sends out a signal indicating the meteorological conditions prevailing beneath the aircraft.

It is a further object of this invention to provide an instrument which when dropped from an aircraft sends out a signal indicating the visibility conditions underneath the aircraft.

It is a further object of this invention to provide an instrument which when dropped from an aircraft sends out a signal indicating the humidity of the atmosphere at various heights underneath the aircraft.

These and other objects of the invention will be apparent from a consideration of the accompanying drawing showing a preferred embodiment of the invention taken in connection with the annexed specification, and wherein:

Fig. 1 represents an aircraft flying above the territory in which it is proposed to land.

Fig. 2 illustrates schematically an embodiment of my invention.

Fig. 3 gives a view in perspective of the instrument of Fig. 2.

Fig. 4 illustrates schematically another embodiment of my invention.

Referring now more particularly to Fig. 1 numeral 10 designates an aircraft flying over a territory 11. As shown in the figure the craft is flying above a cloud layer 12 which separates the plane from the ground. Consequently, the navigator is unable to see the ground. If he decides to land by descending through the clouds, without considering that there might be mountains, hills or trees he may strike one of these obstructions at a dangerous speed. In order to avoid descending through the clouds the navigator usually searches for a "hole" or rift in the cloud formation and glimpses at what is below him. It often happens, however, that the navigator is unable to find a rift or that darkness prevents the pilot from making any visual observation whatsoever.

It is therefore of particular importance to the navigator to know the ceiling, i. e., the distance between the ground 11 and the base of the cloud 12. The ceiling is represented in Fig. 1 by the segment AB.

My invention consists in releasing from the plane an exploring mechanism 14 which is normally suspended in the cockpit 15 of the airplane in a tube 16 and in allowing the exploring mechanism to descend to the ground. The place in space at which the exploring mechanism was initially released is designated by C and its trajectory during the descent is represented by a substantially vertical line CDGBA. In the illustration shown the exploring mechanism occupies an instantaneous position at the point D and is located at a height DA above the ground.

The exploring mechanism 14 is provided with vanes 17 which retard its fall and allow it to descend at a substantially constant rate and in a substantially vertical direction along the trajectory CDGBA. It is readily seen from Fig. 1 that the initial part of the trajectory between the points C and G is in a cloudless transparent air. However, after the instrument has reached the point G it becomes surrounded by the turbid medium of an assemblage of particles of water or ice, formed by the condensation of water vapor in the air. Such a medium constitutes the cloud 12. The subsequent part of the trajectory between the points G and B is therefore located in the cloud 12 and after having reached the point G the descending instrument enters again into a transparent, cloudless atmosphere and remains in it until the instrument reaches the ground 11 at the point A.

The exploring instrument 14 consists essentially of a turbidity or visibility indicator cooperating with a radio transmitter for transmitting the turbidity or visibility indication by means of an antenna 18. The turbidity or visibility indicator is so designed that when the instrument is surrounded by the cloud 12, i. e., by a medium, the turbidity of which is greater than a certain amount that is associated with good visibility a modulated signal is radiated from the antenna 18. However, when the instrument is located in a transparent atmosphere outside of the cloud 12 no modulation is impressed on the carrier transmitted from the antenna 18. The instrument is also designed to transmit a special characteristic signal when it reaches the ground at completion of its trajectory.

Consequently during the part of the trajectory corresponding to the segment CG the instrument transmits only an unmodulated carrier, since it is travelling through non-turbid, transparent, cloudless air. As soon however, as the instrument penetrates into the cloud 12, a characteristic modulation is impressed on the carrier. The modulation is continuous and lasts as long as the instrument descends along the portion GB of its trajectory. When the instrument leaves the cloud at the point B the modulation ceases and no tone is being heard during the descent along the trajectory BA. When the instrument hits the ground at the point A it automatically transmits a characteristic signal characterizing the end of the trajectory.

A radio receiver 19 provided with antenna 20 and earphones 21 is located in the airplane and enables the navigator to listen to the signals transmitted by the instrument 14 and to interpret the information contained therein.

It is therefore apparent that the instrument 14 transmits a modulated carrier only when it is travelling through fog or cloud and that the length of transmission is directly proportional to the thickness of the layer of cloud or fog 12.

The instrument could, for example, be adapted so that its rate of descent is 100 feet per second, and the radio transmitter will therefore transmit a signal the duration of which will be one second for every 100 feet of height. The navigator in the plane 10 has merely to listen and measure with a stop watch the height or thickness of cloud layers. One second would correspond to a height or thickness of 100 feet, two to 200 feet, etc.

As shown in Fig. 2 the exploring instrument is suspended in the tube 16 from the hook 22 which engages the hooked end 23 of a lever 24 pivoted at 25 having an operating handle 26. The opposite end of the lever 24 is connected to the starting button 27 of a stop watch 28 which may be graduated in seconds and fractions of seconds or in units of length.

The essential parts of the exploring instrument 14 are contained in a metallic casing 29 having its upper portion 30 relatively wide and provided with vanes 17. The lower part 31 of the casing is comparatively narrower, and is ended by a hollow shaft 32. A rotatable housing 33 is provided at the lower part of the instrument and is adapted to rotate about the hollow shaft 32 on bearings 34. The rotatable housing 33 is provided with vanes 35 which are arranged so as to set the housing into a rotary motion by means of the force of the wind that is caused by the descent of the instrument.

The casing of the exploring mechanism is provided with two windows designated respectively by 36 and 37, the window 36 being in the upper casing and the window 37 being in the lower casing. The rotatory housing is provided with a window 38 which once during every rotation of the housing is made to come into juxtaposition with the window 37.

In the lower part of the casing 29 in front of the window 37 is located a source of light 39 and a lens 40. Once during every rotation of the housing when the windows 38 and 37 are in juxtaposition the source 39 transmits light through the lens 40 and the windows 37, 38 into the medium surrounding the exploring instrument. Consequently during the descent of the exploring instrument the housing 33 is set into rotation and by closing and opening of the window 37 it allows the light from the source 39 to illuminate intermittently the medium surrounding the exploring instrument.

In the upper part of the casing 29 in front of the window 36 is located a lens 41 which is adapted to transmit the light that might be present in the surrounding medium outside of the window 36 upon a photocell 42. The photocell 42 is connected through an amplifier 43 to a filter 44. The filter 44 is of the band pass type and transmits only a narrow band of frequencies which corresponds to the frequency with which the light transmitted from the source 39 through the lens 40 and the window 37 is being interrupted by the rotating housing 33. It is apparent therefore that the filter transmits a signal only when the photocell is energized by modulated light and that no response is produced when the photocell is energized by steady light as for example daylight. The output of the filter 44 is rectified by rectifier 45 and then impressed on the modulator 46. The modulator 46 is arranged to modulate the radio transmitter 47. The modulator 46 is also connected to an oscillator 48 and to an oscillator 49, the connection between the modulator 46 and the oscillator 49 is being made by means of a switch 50. The switch 50 is made of a stationary contact 51 and of a movable contact consisting of a lever 52 rotatable around its midpoint 53 and having its extreme points connected to a spring 54 and to a cable 55 respectively. The cable 55 is guided by the pulley 56 and passes through the hollow shaft 32. At the end of the cable 55 there is attached a weight 57. The weight 57 opposes the action of the spring 54 and maintains the switch open and thus prevents any connection between the oscillator 49 and the modulator 46.

The instrument is normally placed in the tube 16 suspended by the hook 22 from the hooked end 23 of the lever 24. The lever is pivoted at 25 and has an operating handle 26. The opposite end of the lever 24 is connected to the starting button 27 of a stop watch 28 which may be graduated in seconds and fractions of seconds or in units of length.

The instrument is provided with the main switch 58 which controls the energizing or de-energizing of the various component elements such as amplifier, rectifier, oscillators etc. When the instrument is suspended by the hook 22, in a manner shown in the drawing the weight of the instrument draws the switch bar 59 out of contact with the terminal 60 thereby deenergizing the component elements and putting the exploring instrument into an "off" condition.

To release the exploring instrument the navigator draws the operating handle 26 in the direction indicated by the arrow. This releases the instrument for its descent, turns the main switch 58 "on" and simultaneously releases the starting button of the stop watch 28 which begins to indicate the elapsed time. At the same time the navigator listening in the ear phones 21 is prepared to hear a signal sent by the exploring mechanism when the said mechanism becomes immersed in a cloud.

During the first few seconds the instrument descends along the trajectory CG and is surrounded by a cloudless non-turbid medium. The air current caused by the descent of the instruments sets the housing 33 of the instrument into a revolving motion and consequently causes the recurrent opening and closing of the optical path between the source of light 39 and the outside atmosphere. It is apparent that once during each revolution when the window 37 in the lower part of the casing 29 and the window 38 of the revolving housing coincide, the optical path is uninterrupted. Consequently an intermittent beam of light is transmitted into the atmosphere and the frequency with which the beam is interrupted is determined by the speed of revolution of the housing 33.

It is apparent that as long as the instrument is surrounded by a non-turbid medium, the light transmitted from the source 39 through the windows 37 and 38, forms a substantially rectilinear beam and it is dissipated gradually with distance. Under such conditions, i. e., when the atmosphere is clear and transparent, no scattering and no reflection takes place. Consequently the photoelectric cell 42 does not receive any contribution from this beam, and the only illumination to which the photoelectric cell 42 may be exposed is the natural daylight which enters through the window 36. Therefore the photoelectric cell produces a D. C. output which is amplified in 43. The output of the amplifier 43 is unable to pass through the filter 44 because the filter 44 is of a band pass type and attenuates all frequencies with exception of the frequency with which the beam of light derived from the source 39 is being modulated by the revolving housing 33. Consequently under these conditions no output is derived from the filter 44 and no signal is impressed on the modulator 46. It is then apparent that the carrier derived from the transmitter 47 is not being modulated by the oscillator 48 at a voice frequency nor by the modulator 46. Therefore the resultant modulation is zero and only a carrier will be transmitted from antenna 18. Consequently no audible signal is received by the navigator in the aircraft 10.

As soon, however, as the instrument enters the cloud at the point G of its trajectory, the surrounding atmosphere of condensed moisture particles is turbid and has the property of scattering light. Therefore the presence of a cloud is characterized by turbidity due to the presence of condensed moisture particles which cause a considerable decrease in visibility and scattering of light. Consequently the intermittent light transmitted from the source 39 through the lens 40 and the openings 37, 38 becomes scattered by the surrounding atmosphere in all directions and part of the scattered light is returned to the upper part of the housing through the window 36 as a series of light pulses.

It is apparent that under the above circumstances the light, to which the photocell 42 is exposed contains two components, one of the said components being the very steady illumination of the environment, as for example, the illumination caused by daylight and a modulated component. The modulated component is caused by the scattering of the modulated light transmitted to the environment from the source 39. Therefore in the output of the photocell 42 there appears a D. C. component and an A. C. component the said D. C. component being derived from the daylight and the A. C. component being derived from the scattering due to the turbidity of the medium containing the cloud. The D. C. component is blocked by the filter 44 and only the A. C. component appears across the output terminals of the filter. This A. C. component is subsequently rectified in 45 and applied to the modulator 46. Under these conditions the carrier current generated in 47 is modulated by the oscillator 48 at a voice frequency.

It is apparent that the speed of the descent of the instrument can be controlled within certain limit by the design of the vanes 17 and the speed of rotation of the housing 33 can be controlled by the design of the vanes 35.

It is apparent that at the instant when the exploring mechanism 14 reached the point G a modulated signal is being transmitted by the antenna 18 and the navigator notes the reading of the stop watch 28, and by time interval lapsed since he released the instrument he is able to determine the length of the segment CG, i. e., the depth at which the cloud begins. During the subsequent travel of the exploring mechanism a modulated signal is being transmitted the duration of which is one second for each 100 feet of trajectory. One second would therefore correspond to 100 feet, two seconds to 200 feet etc. This signal is received as long as the instrument follows the trajectory GB and as soon as the instrument reaches the bottom of the cloud at B, the modulated signal ceases. The navigator then notes the reading on the stop watch 28 and if for instance, the transmission of the signal lasted 10 seconds the navigator deduces that the thickness of the cloud represented by the segment GB is 1000 feet.

After the exploring instrument has reached the point B it enters a transparent cloudless medium and again no modulation is present for a certain time interval that is required to cover the trajectory BA. When however, the exploring mechanism reaches the point A, the weight 57 hits the ground and releases the tension on the cable 55. Consequently, the force of the spring 54 is not counterbalanced any more by the weight 57 and causes the swinging of the switch bar 52 into a new position shown by the dotted lines. In passing between the two positions shown, the switch bar 53 is allowed for a short period of time to come into contact with the contact 51 and thus allows the output of the oscillator 49 to modulate the output of the modulator stage 46. The oscillator 49 generates an extremely intense signal having a different frequency from the signal generated by the oscillator 48. Consequently when a connection between the oscillator 49 and the modulator 46 becomes established for a short time interval the transmitter 47 is modulated by the oscillator 49. The oscillator 49 generates a signal that is so strong that the modulation occurs independently of whether or not there is any output from the filter 44. A characteristic signal is therefore transmitted by the antenna 18 at the instant the instrument hits the ground and this informs the navigator that the instrument has reached the ground. Upon the receipt of this signal the navigator stops the watch 28 and then determines the number of seconds that has elapsed since the exploring instrument has left the point B until the instant of contact with the ground. Noting the number of seconds the navigator can determine the height of the ceiling in the territory in which he proposes to land.

It is therefore apparent that I have provided a method of and a means for determining the thickness and height of clouds below the aircraft and the ceiling height in the territory underneath the aircraft.

The embodiment illustrated in Fig. 2 and Fig. 3 and the method described in connection with this embodiment utilizes optical measurements performed by means of a photoelectric cell. A cloud has been identified by its ability to scatter light and means have been provided to produce in the exploring instrument a beam of light, to direct the beam into the surrounding medium and to detect any amount of light that may be scattered by the surrounding cloud and returned to the exploring instrument. If there is no scattered light the atmosphere was assumed to be transparent and cloudless. If there is scattered light the atmosphere was assumed to contain spacially distributed condensed moisture particles which constitute a cloud. It is, however, apparent that I may utilize any other method for identifying a cloud. I may for instance differentiate the cloud from the surrounding atmosphere by its specific humidity and instead of measuring the property of the atmosphere to scatter light I may measure the amount of moisture present in the atmosphere and deduce therefrom the presence or the absence of a cloud.

In the embodiment shown in Fig. 4 I provide a device for performing humidity measurements and am combining this device with a radio transmitter for radiating signals which indicate the presence of high humidity. Fig. 4 illustrates a container 80 the upper part of which designated by the numeral 81 is hermetically sealed, and the lower part of which designated by the numeral 82 is exposed to the surrounding atmosphere which enters through a relatively large opening 83. The lower part of the instrument contains a device for measuring humidity 84 and an electric switch 85. The device for measuring humidity may be of any of the several types well known in the art and may consist of a psychrometer, or a hair hygrometer, or a dew point hygrometer or may be based upon chemical or electrical measurements. A detailed description of any of the currently used moisture determining devices can be found in the aforementioned book on "Meteorological Instruments" by W. E. Knowles Middleton in pages 85–101. In the embodiment illustrated in Fig. 4 I have chosen a hair hygrometer which depends for its operation upon the fact that a strand of hair will change its length in atmospheres of different humidities. The hair hygrometer 84 consists of several strands of human hair 75 stretched horizontally in a manner shown in the figure and connecting two bars designated by 86 and 87 respectively. The bar 86 is fastened to the walls of the container at the point 88 and the bar 87 is fastened to the walls of the container at the point 89 by means of a spring 90. The spring 90 is normally extended and tries therefore to stretch the hair 75 horizontally in a manner shown in the figure. The switch 85 consists of a stationary contact element 91 and a movable contact element 92. The movable contact element consists of a rigid segment of wire having one of its extremities pivoted at the point 93 and having another extremity fastened to and free to move with the bar 87. Fig. 4 illustrates the conditions of low humidity and consequently the length of the stretched hair 75 is such that the wire 92 is unable to touch the contact 91 in spite of the pressure exerted by the spring 90 and consequently the switch 85 remains open. If however the humidity of the medium increases, the hair elongates and the force of the spring moves the wire 92 and enables it to contact the terminal 91. The position of the wire 92 and of the bar 87 under such conditions is shown by means of dotted lines.

It is therefore, apparent that the switch 85 is responsive to the conditions of humidity prevailing in the surrounding medium. If the humidity is low, the switch 85 is open and if the humidity is high, the switch is closed.

The upper part 81 of the instrument contains a radio transmitter 94 connected to an antenna 95 and adapted to be controlled by a modulator 96. The modulator 96 is connected to a voice frequency oscillator 97 by means of the switch 85 and to another voice frequency oscillator 98 by means of a switch 99. The oscillator 98 is capable of transmitting a frequency which is different and of a much greater intensity than the frequency of the oscillator 97.

The switch 99 is made of a stationary contact 100 and of a movable contact consisting of a lever 101 rotatable around its midpoint 102 and having its extreme points connected to a spring 103 and to a cable 104 respectively. The cable 104 is guided by pulleys 105 and supports at its end a weight 106. The weight 106 opposes the action of the spring 103 and maintains the switch open and thus prevents any connection between the oscillator 98 and the modulator 96.

The instrument is provided with vanes 107 the purpose of which is to slow down its descent when it is released from the aircraft. Normally when in the aircraft the instrument is placed in the tube 16 and suspended by the hook 108 from the hooked end 23 of the lever 24. The lever is pivoted at 25 and has an operating handle 26. The opposite end of the lever 24 is connected to the starting button 27 of a stop watch 28.

Assume now that the instrument has been released by turning the handle 26 in the direction indicated by the arrow and allowed to descend to the ground by following the substantially vertical trajectory CDGBA shown in Fig. 1. During the descent of the instrument the navigator is listening to the ear phones 21 and is prepared to hear a signal sent by the exploring mechanism when the said exploring mechanism becomes immersed in a cloud.

It is apparent that in the beginning of its travel when the instrument is still submerged in the cloudless and dry atmosphere between the points C and G the switches 85 and 99 are open and therefore the oscillators 97 and 98 are not connected to the modulator 96. Therefore the modulation is zero and only a carrier will be transmitted from the antenna 96. Consequently no audible signal is received by the navigator in the aircraft 10. When, however, the instrument reaches the point G and becomes immersed in the cloud layer 12 the switch 85 closes because the prevailing humidity of the cloud layer causes the hair 75 to elongate and therefore cooperates with the action of the spring 90 which tends to move the wire 92 towards the contact 91 to a position shown by dotted lines. Under such conditions the circuit between the oscillator 97 and the modulator 96 is established, and the transmitter 94 radiates a radio frequency signal modulated at a voice frequency by the oscillator 97. It is apparent that a modulated signal will be radiated from the antenna 95 as long as the instrument is immersed in the cloud layer 12, i. e., during the part of its trajectory from the point G to the point B. After the instrument has reached the point B it becomes again surrounded by a dry and cloudless atmosphere. Then the hair 75 contracts thus causing the switch 85 to open and to disconnect the oscillator 97 from the modulator 96. Consequently the signal radiated from the antenna 95 ceases to be modulated and only carrier will be transmitted by the antenna 95 until the instrument reaches the ground at the point A.

When the instrument reaches the ground at the point A the weight 106 hits the ground and releases the tension of the cable 104. Consequently the force of the spring 103 is not counterbalanced any more by the weight 106 and causes the swinging of the bar 101 into a new position shown by dotted lines. In passing between the two positions, the switch bar 101 is allowed for a short period of time to come into contact with the contact 100 and thus causes the output of the oscillator 98 to be applied to the modulator 96. The oscillator 98 generates an extremely intense signal having a different frequency from the signal generated by the oscillator 97. Consequently when a connection between the oscillator 98 and the modulator 96 becomes established for a short time interval the transmitter 94 is modulated by the oscillator 98. A characteristic signal is therefore transmitted by the antenna 95 at the instant the instrument hits the ground and this informs the navigator that the instrument has reached the ground.

During the descent of the instrument, the navigator located in the plane 10 notes on the chronometer 28 the instant at which the instrument was released from the point C and the successive instants when the instrument enters the cloud (at the point G when the reception of the signal begins), when the instrument leaves the cloud (at the point B when the reception of the signal ceases) and when the instrument hits the ground (at the point A when a short strong signal is released).

From this information and the known average speed of descent of the instrument, the navigator can determine the various segments of the line CDGBA by multiplying the speed of the instrument by the time interval between the points under consideration, all in the manner explained above with reference to the Fig. 2 embodiment of the invention.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a system for determining the distance from a base of a cloud to the earth's surface or the surface of a body of water in the territory below an aircraft; radio signal translating means in said aircraft; and a radio signal transmitting device releasable from said aircraft to fall at a known speed and operative to transmit signals to said signal translating means during at least a part of its falling movement, said device including means responsive to the emergence of said device from the base of a cloud for causing said signal translating means to provide one indication, and means responsive to the subsequent contacting of at least a portion of said device with the earth's surface or the surface of a body of water for causing said signal translating means to provide a different indication; whereby the elapsed time between said indications provides an indication of the distance between the base of said cloud and the surface contacted by said part of said device.

2. In a system controllable aboard an aircraft to indicate aboard the craft the presence or absence of a cloud in a particular zone beneath said aircraft; radio signal translating means in said aircraft; and a radio signal transmitting device operative to transmit signals to said signal translating means and releasable from said aircraft to fall at a known speed, said device including means responsive to movement of said device through said particular zone for causing said signal translating means to provide different indications depending upon the presence or absence of a cloud in said particular zone; whereby the known speed of falling movement of said device and the indication produced by said signal translating means may be correlated aboard said aircraft to provide an indication of the presence or absence of a cloud in said particular zone.

3. In a system for determining the distance from the base of a cloud to the earth's surface or the surface of a body of water in the territory below an aircraft; radio signal translating means in said aircraft; and a radio signal transmitting device releasable from said aircraft to fall at a known speed and operative to transmit signals to said signal translating means during at least a part of its falling movement, said device including means responsive to the entry of said device into a cloud for causing said signal transmitting means to provide a first indication and responsive to the emergency of said device from the base of said cloud for causing said signal translating means to provide a second indication, whereby the elapsed time between said indications indicates the thickness of said cloud, and means responsive to the subsequent contacting of at least a part of said device with the earth's surface or the surface of a body of water for causing said signal translating means to provide a third indication; whereby the elapsed time between said second and third indications provides an indication of the distance between the base of said cloud and the surface contacted by said part of said device.

4. In a system for determining the distance from the base of a cloud to the earth's surface or the surface of a body of water in the territory below an aircraft; a radio signal transmitting device releasable from said aircraft to fall through a cloud at a known speed and including means responsive to the emergence of said device from the base of said cloud for transmitting one signal to said aircraft, and means responsive to the contacting of at least a part of said device with the earth's surface or the surface of a body of water for transmitting a different signal to said aircraft; and receiving means in said aircraft for translating said signals to provide an indication of the elapsed time therebetween.

5. In a system for determining the thickness of a cloud and the distance from the base of the cloud to the earth's surface or the surface of a body of water in the territory below an aircraft; a radio signal transmitting device releasable from said aircraft to fall through a cloud at a known speed and including means responsive to the entry of said device into said cloud for transmitting a first signal to said aircraft and responsive to the subsequent emergence of said device from the base of said cloud for transmitting a second signal to said aircraft, and means responsive to the subsequent contacting of at least a part of said device with the earth's surface or the surface of a body of water for transmitting a third signal to said aircraft; and receiving means in said aircraft for translating said signals to provide indications of the time intervals between said successively transmitted signals.

6. A radio transmitting device adapted to be released from an aircraft for falling movement to the earth or a body of water over a path which may include a cloud, comprising light transmitting means, radio transmitting means operative to transmit a signal during at least a part of the falling movement of said device, means responsive to cloud reflection of the light radiated from said light transmitting means for changing the signal output of said transmitting means in one predetermined manner when said device traverses a cloud, whereby the signal output of said transmitting means is changed in response to emergence of said device from the base of a cloud and means responsive to the contacting of said device with the earth's surface or the surface of a body of water for changing the signal output of said transmitting means in a different predetermined manner.

7. A radio transmitting device adapted to be released from an aircraft for falling movement to the earth or a body of water over a path which may include a cloud, comprising means responsive to the emergence of said device from the base of a cloud for transmitting a predetermined signal, and means responsive to the contacting of said device with the earth's surface or the surface of a body of water for transmitting a different signal.

8. A radio transmitting device adapted to be released from an aircraft for falling movement to the earth or a body of water over a path which may include a cloud, comprising means for transmitting an unmodulated signal carrier so long as said device traverses a cloud free atmosphere, means responsive to movement of said device through a cloud for modulating said carrier at a predetermined frequency, and means responsive to the contacting of said device with the earth's surface for modulating said carrier at a different frequency.

9. A radio transmitting device adapted to be released from an aircraft for falling movement to the earth or a body of water over a path which may include a cloud, comprising two parts rotatable relative to each other in response to falling movement of the device and provided with openings which are periodically brought into registry during relative rotation of said parts, means for projecting a light beam through the periodically registered openings which is only reflected by a cloudy atmosphere, means for transmitting an unmodulated signal carrier so long as said device traverses a cloud free atmosphere, means controlled by the reflected light for modulating said carrier at a frequency determined by the speed of relative movement between said parts when said device traverses a cloud, and means responsive to the contacting of said device with the earth's surface for modulating said carrier at a different frequency.

10. A radio transmitting device adapted to be released from an aircraft for known speed falling movement to the earth or a body of water over a path which may include a cloud layer, comprising radio signal transmitting means operative to transmit a signal during said falling movement, means responsive to the emergence of said device from the base of a cloud for changing the character of the signal transmitted by said signal transmitting means and means responsive to the contacting of said device with the earth's surface for again changing the character of said signal, whereby the time elapsing between said changes provides an indication of the distance between the base of said cloud and the surface contacted by said device.

11. In a system controllable aboard an aircraft to indicate aboard the craft the absence or the presence and thickness of a cloud in the flying zone beneath said aircraft; radio signal translating means in said aircraft; and a radio signal transmitting device operative to transmit signals to said signal translating means and releasable from said craft for free falling movement through said zone, said device including means responsive to movement of said device through a cloud in said zone for causing said signal translating means to provide an indication of the presence of the cloud and the thickness thereof, whereby the indication produced by said signal translating means and the ascertainable positions of said device in said zone may be correlated aboard said craft to provide an indication of the location of the cloud in said zone.

12. A radio transmitting device adapted to be released from an aircraft for falling movement to the earth or a body of water over a path which may include a cloud, comprising means for transmitting light pulses into the atmosphere which are only scattered by a cloudy atmosphere, means for transmitting an unmodulated signal carrier so long as said device traverses a cloud free atmosphere, means controlled by the scattered light for modulating said carrier at a frequency determined by the frequency of said pulses when said device traverses a cloud, and means for preventing said last-named means from responding to light other than said scattered light.

SERGE ALEXANDER SCHERBATSKOY.